United States Patent [19]

Morgan

[11] Patent Number: 4,552,661
[45] Date of Patent: * Nov. 12, 1985

[54] LIQUID FILTER HAVING SELF-RETAINING FILTER BAGS

[76] Inventor: Howard W. Morgan, P.O. Box 735, Michigan City, Ind. 46360

[*] Notice: The portion of the term of this patent subsequent to Mar. 31, 1998 has been disclaimed.

[21] Appl. No.: 497,426

[22] Filed: May 24, 1983

Related U.S. Application Data

[63] Continuation of Ser. No. 486,396, Apr. 19, 1983, abandoned, which is a continuation-in-part of Ser. No. 311,962, Oct. 16, 1981, abandoned.

[51] Int. Cl.[4] .............................................. B01D 29/30
[52] U.S. Cl. .................................. 210/232; 210/323.2
[58] Field of Search ..................... 210/323.2, 484, 485, 210/454, 232, 339, 455, 345

[56] References Cited

U.S. PATENT DOCUMENTS

| | | | |
|---|---|---|---|
| 3,526,323 | 9/1970 | Smith | 210/484 |
| 3,814,261 | 6/1974 | Morgan, Jr. | 210/484 |
| 4,022,693 | 5/1977 | Morgan, Jr. | 210/455 |
| 4,133,769 | 1/1979 | Morgan, Jr. | 210/455 |
| 4,204,966 | 5/1980 | Morgan, Jr. | 210/455 |
| 4,259,188 | 3/1981 | Morgan, Jr. | 210/488 |
| 4,322,293 | 3/1982 | Morgan, Jr. | 210/323.2 |

Primary Examiner—John Adee
Attorney, Agent, or Firm—James D. Hall

[57] ABSTRACT

An improvement in the construction of liquid filters having replaceable filtering bags in which each bag is formed to snap fit into a groove formed within the upper portion of the filter housing.

3 Claims, 6 Drawing Figures

LIQUID FILTER HAVING SELF-RETAINING FILTER BAGS

CROSS-REFERENCE TO RELATED APPLICATIONS

This application is a continuation of application Ser. No. 486,396, filed Apr. 19, 1983, which is a continuation-in-part of application Ser. No. 311,962, filed Oct. 16, 1981, both now abandoned.

SUMMARY OF THE INVENTION

This invention relates to a further improvement in the construction of liquid filters using replaceable self-retaining filter elements.

Filter elements, such as bags, are normally seated in openings into the interior of the filter housing located within the liquid flow path through the filter. The bag is held in place by various methods, such as an overlying plate or cover as shown in U.S. Pat. Nos. 3,503,516; 4,022,693; and 4,259,188; or by a bag and housing engagement as shown in U.S. Pat. Nos. 4,133,769 and 4,204,966.

The invention described herein calls for the formation of an upwardly angled V-shaped channel about the bag-receiving opening in the filter housing. The bag itself includes an annular-shaped retaining ring part which defines the opening into the bag. This ring part has a flexible down-turn lip which, when the bag is fitted into a housing bag-receiving opening, interlocks with the channel about the housing opening to secure the bag in place within the housing. No cover, extra plate or other filter component is necessary to secure the filtering bags.

This means of securing the filtering bags in place within the filter is expedient and efficient. It, also, normally allows the filter to be more economically constructed than those filters which use the cover to retain the bags. The seal formed between the bag lip and housing opening channel is secure, thereby making it unnecessary to provide a separate seal between the housing and any supporting basket used with the bag.

Accordingly, it is an object of this invention to provide a liquid filter in which the filtering bag is secured within the filter housing by a snap-fit engagement.

Another object of this invention is to provide a filter of efficient and economical construction.

Other objects of this invention will become apparent upon a reading of the description set forth below.

DESCRIPTION OF THE PREFERRED EMBODIMENTS

Figure 1:
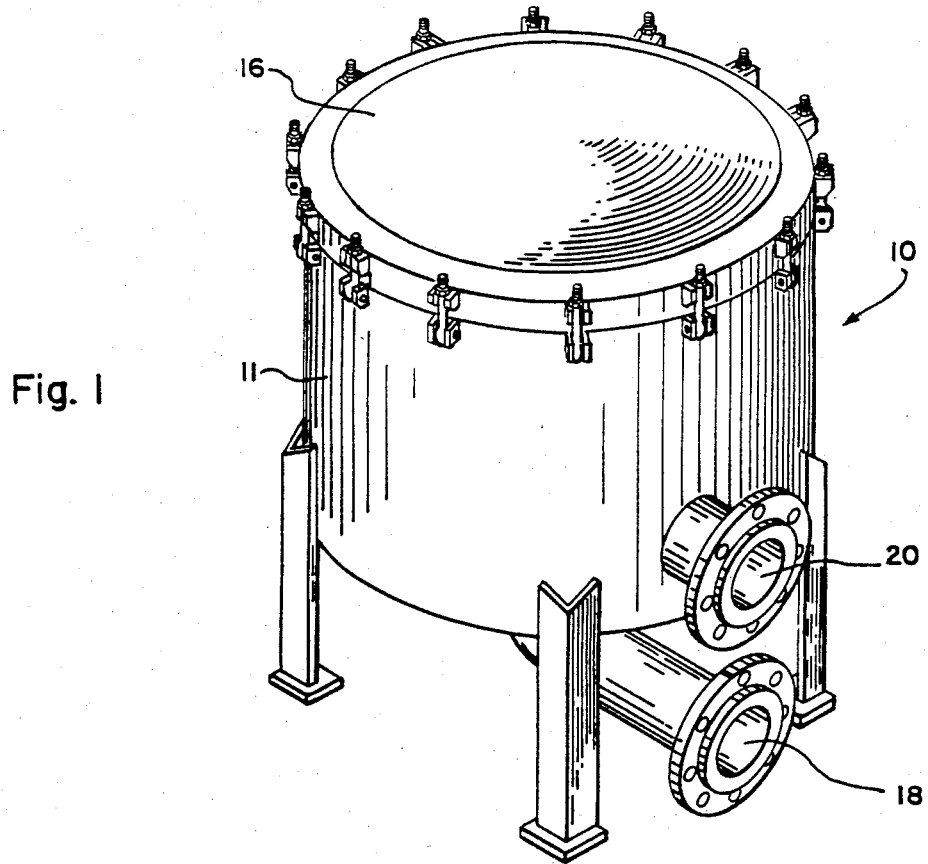
FIG. 1 is a perspective view of a filter assembly.
Figure 2:
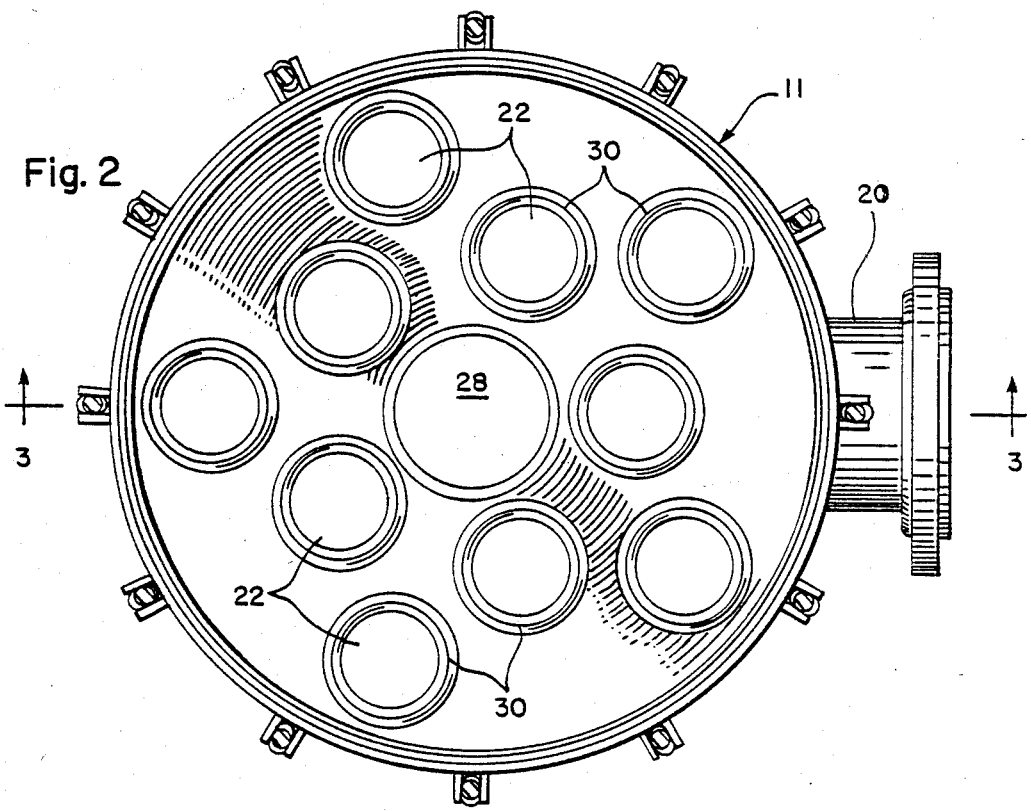
FIG. 2 is a top view of the filter housing with the cover removed for purposes of illustration.
Figure 3:
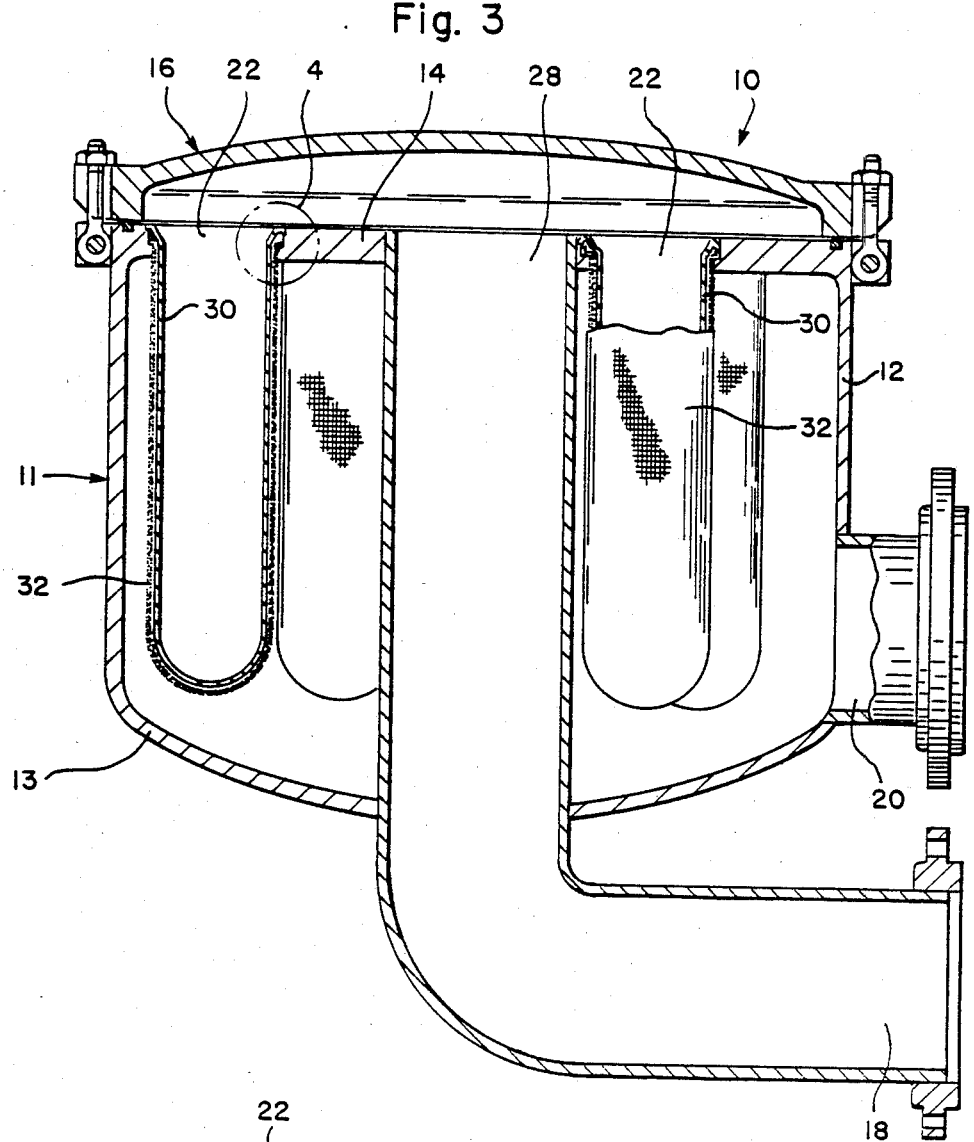
FIG. 3 is a sectional view taken along line 3—3 of FIG. 2.

The preferred embodiments illustrated are not intended to limit the invention to the precise forms disclosed. They are shown and described to best illustrate the invention and to enable one skilled in the art to use the invention.

In FIGS. 1-4, a multiple element filter assembly 10 is shown. Assembly 10 includes a housing 11 and a cover 16. Housing 11 has a side wall 12, a bottom wall 13, an upper wall 14, an inlet port 18, and an outlet port 20. Upper wall 14 has a plurality of openings 22 located in it. Each opening 22 is defined by a marginal section having an upper channel part 24 and a lower shoulder part 26. Upper wall 14 also includes a central liquid inlet opening 28 to provide for fluid communication between inlet port 18 and openings 22. Each upper wall opening channel part 24 is of an irregular V-shape having a horizontal base 25 and an upwardly and inwardly tapered side 27.

A filtering bag 30 is inserted into each opening 22 and is supported therein by a rigid basket 32. Bag 30 includes a flexible, normally cloth-like liquid pervious sack part 31 and a shape-retaining liquid impervious ring part 36 which terminates in an annular flexible but shape-retaining lip 38. Basket 32, except for upper flange 33, is constructed of a pervious material such as screen and serves to support bag 30 at its sack part 31.

Figure 4:
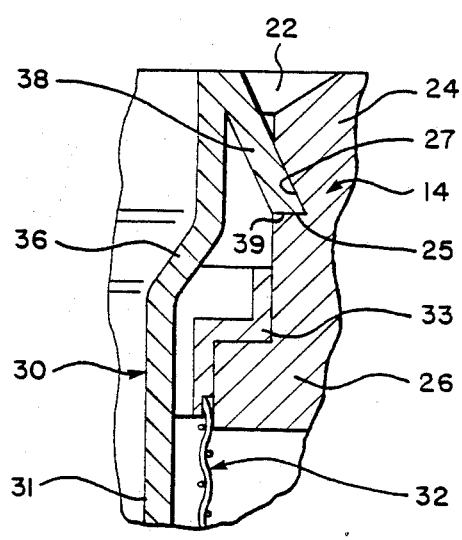
FIG. 4 is an enlarged view of that portion of FIG. 3 within broken line 4.
Figure 4A:
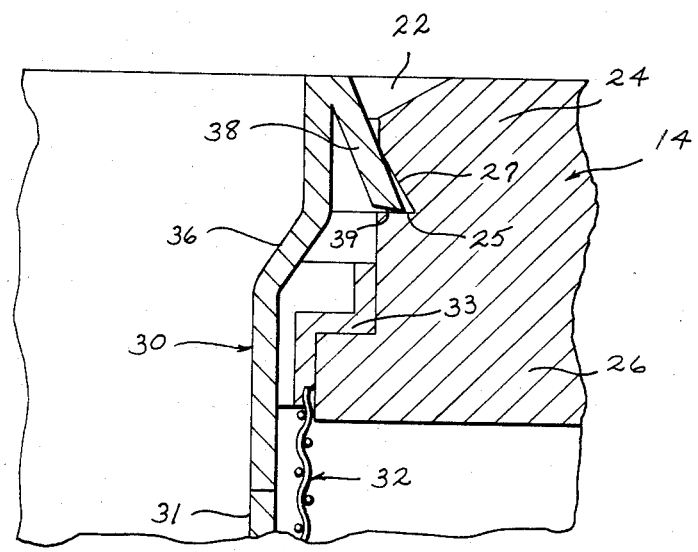
FIG. 4A is an enlarged view similar to FIG. 4, but showing the filter bag held in an alternative manner.

A basket 32 is fitted into each housing opening 22 with its flange 33 resting upon shoulder part 26 of the opening. A bag 30 is then inserted into each basket 32 with its ring part lip 38 being flexed or snap-fitted into the opening channel part 24. The fit of the lip 38 in its receiving channel part 24 is generally complemental with the end edge 39 of the lip resting upon base 25 and the outer side wall of the lip being biased by the lip flexure against side 27 of the channel part, as seen in FIGS. 4 and 4A, to provide a sure liquid seal between the lip and channel part independently of cover 16. In some forms of the filter, baskets 32 may not be needed with only filtering bags 30 being used.

Figure 5:
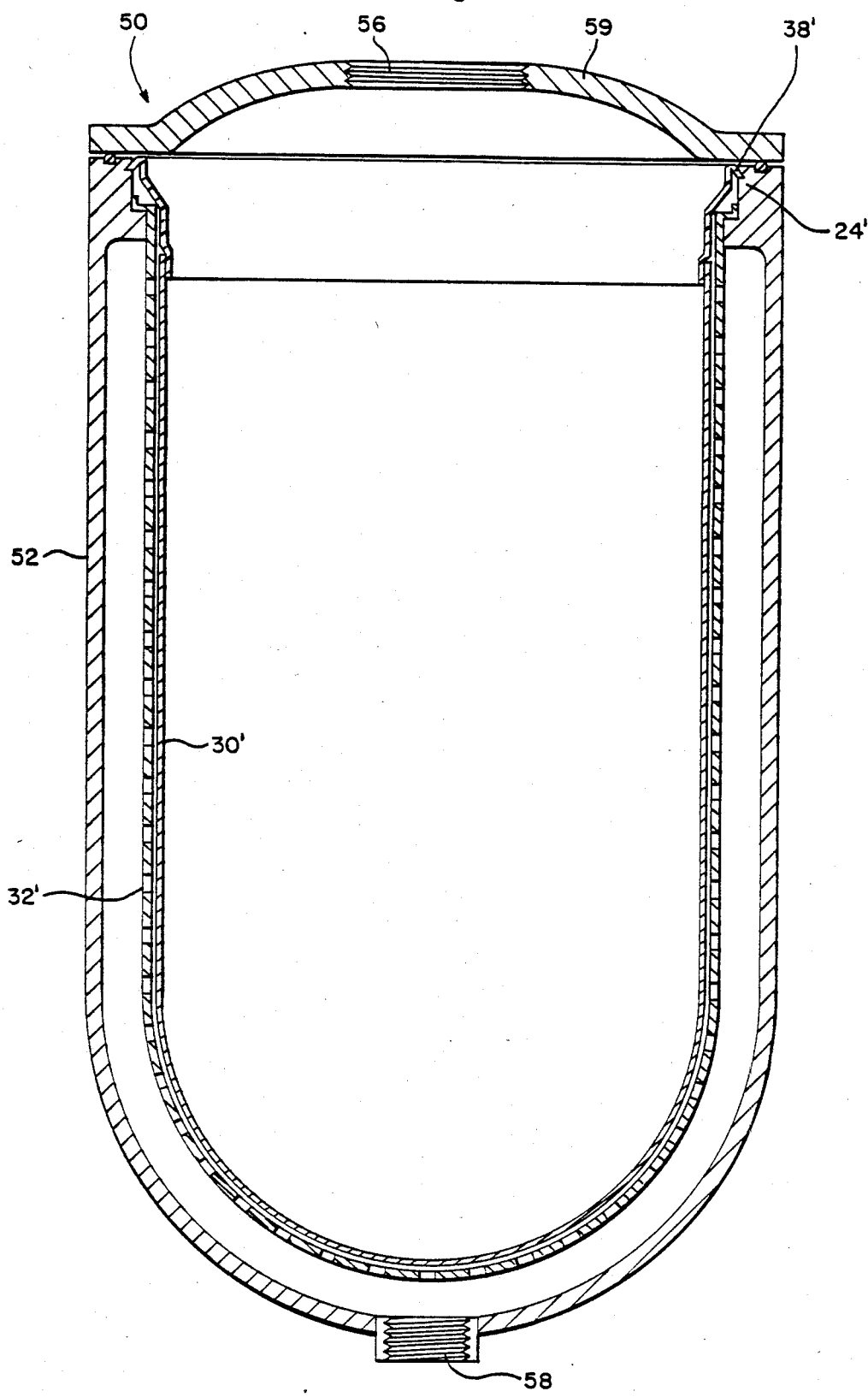
FIG. 5 is a sectional view of another embodiment of this invention.

Another embodiment of this invention is shown in FIG. 5 as being incorporated into a single element filter 50. Filter 50 includes a housing 50 and a cover 59, and has an inlet 56 and an outlet 58. A rigid basket 32' is supported by housing 52 and a filtering bag 30' fits within the basket. The flexible shape-retaining lip 38' of bag 30' is snap-fitted into housing channel part 24' as described in the filter assembly 10 of FIGS. 1-4 independently of cover 59.

It is to be understood that the invention is not to be limited to the preceding description, but may be amended within the scope of the appended claims.

What I claim is:

1. In a liquid filter including a housing having an upper part defining at least one opening into the interior of said housing, a removable cover spanning said housing opening, inlet and outlet ports providing fluid communication with said housing interior through said housing opening, a filter bag having a reticulated sack part, said ring part including a flexible down-turned lip having an angled side wall and terminating in an end edge, said housing upper part including a channel circumscribing said defined housing opening, the improvement wherein said channel includes a base generally paralleling the plane of said housing opening and a side tapering upwardly and inwardly relative to the opening, said bag sack part extending through said housing opening and said bag ring part lip seated in said channel with the side wall of said lip being urged against the side of said channel and the end edge of said lip contacting the base of said channel to secure and seal said bag to said housing at said housing upper part.

2. The filter of claim 1, wherein said housing upper part is a top wall having a plurality of openings therein, a said channel formed in said top wall circumscribing each said opening, a said bag fitted into each opening with said lip thereof so seated in said circumscribing channel.

3. The filter of claim 2 and a rigid reticulated basket fitted into each said opening and supported by said top wall at the upper margin of the basket, each bag sack part fitting into a said basket with said attached lip overlying the upper margin of the basket.

* * * * *